US010252768B2

(12) United States Patent
Goes et al.

(10) Patent No.: US 10,252,768 B2
(45) Date of Patent: Apr. 9, 2019

(54) BICYCLE

(71) Applicants: Johannes Marie Quirinus Goes, Lelystad (NL); Pascal Tribotté, Versailles (FR)

(72) Inventors: Johannes Marie Quirinus Goes, Lelystad (NL); Pascal Tribotté, Versailles (FR)

( * ) Notice: Subject to any disclaimer, the term of this patent is extended or adjusted under 35 U.S.C. 154(b) by 252 days.

(21) Appl. No.: 15/507,729

(22) PCT Filed: Aug. 31, 2015

(86) PCT No.: PCT/NL2015/000026
§ 371 (c)(1),
(2) Date: Feb. 28, 2017

(87) PCT Pub. No.: WO2016/036237
PCT Pub. Date: Mar. 10, 2016

(65) Prior Publication Data
US 2017/0240243 A1 Aug. 24, 2017

(30) Foreign Application Priority Data

Sep. 1, 2014 (NL) .................................... 1040932

(51) Int. Cl.
*B62K 25/28* (2006.01)
*B62K 3/04* (2006.01)
(Continued)

(52) U.S. Cl.
CPC .............. *B62K 25/286* (2013.01); *B62K 3/04* (2013.01); *B62K 19/34* (2013.01); *B62K 21/02* (2013.01); *B62K 21/12* (2013.01); *B62M 3/08* (2013.01)

(58) Field of Classification Search
CPC ...... B62K 25/04; B62K 25/286; B62K 19/00; B62K 19/34; B62K 21/02; B62K 21/12; (Continued)

(56) References Cited

U.S. PATENT DOCUMENTS

| 5,452,910 A * | 9/1995 | Harris ..................... B62K 25/26 280/283 |
| 2001/0030408 A1 * | 10/2001 | Miyoshi ................. B62K 25/04 280/276 |

(Continued)

OTHER PUBLICATIONS

International Search Report and Written Opinion for related International Patent Application No. PCT/NL2015/000026 dated Feb. 15, 2016.

(Continued)

*Primary Examiner* — Joseph M Rocca
*Assistant Examiner* — Daniel S Yeagley
(74) *Attorney, Agent, or Firm* — Troutman Sanders LLP; Ryan Schneider

(57) ABSTRACT

A mountain bike comprises: —a frame (10); —a rear wheel (2) having its axle mounted in rear dropouts (16) of the frame; —a front wheel (3) having its axle mounted in front dropouts (18) of the frame; —a pedal set (20) comprising a spindle mounted for rotation in a bottom bracket shell (19) of the frame, two cranks (22) mounted at the opposite ends of the spindle, and two pedals (21) mounted for rotation at the free ends of the respective cranks; wherein each crank (22) has a crank length L of 164 mm or less; wherein the bottom bracket shell (19) has a Practical Bracket Height PBH of 294 mm or less, wherein $PBH=BH-\beta \cdot (\alpha \cdot FST+(1-\alpha) \cdot RST)$, wherein BH indicates bracket height, FST indicates Front Suspension Travel, and RST indicates Rear Suspension Travel.

19 Claims, 6 Drawing Sheets

(51) Int. Cl.
*B62K 19/34* (2006.01)
*B62K 21/02* (2006.01)
*B62K 21/12* (2006.01)
*B62M 3/08* (2006.01)

(58) Field of Classification Search
CPC .. B62K 3/04; B62M 3/00; B62M 3/08; B60G 17/00; B60G 17/016
See application file for complete search history.

(56) References Cited

U.S. PATENT DOCUMENTS

| | | | | |
|---|---|---|---|---|
| 2011/0233892 | A1* | 9/2011 | Domahidy | B62K 25/286 280/284 |
| 2014/0312592 | A1* | 10/2014 | Hoogendoorn | B62K 25/286 280/284 |

OTHER PUBLICATIONS

Mongoose—09 Tyax Elite. RIDE2ROCK, Oct. 22, 2009 [online] [retrieved on Feb. 22, 2017]. Retrieved from the Internet <URL: https://web.archive.org/web/20091022204948/http://www.ride2rock.jp/products/bike.php?id=30889>.

Kopecky, Greg. "Short Crank Database". Slowtwitch, Jun. 20, 2012 [online] [retrieved Feb. 22, 2017]. Retrieved from the Internet <URL: https://web.archive.org/web/20120826155606/http://www.slowtwitch.com/Tech/Short_Crank_Database_2862.html>.

Mongoose—10 Tyax Sport. Bike and Gear Catalog, CYCLINGTIME.com, 2010 [online] [retrieved on Feb. 22, 2017]. Retrieved from the Internet <URL: http://www.cyclingtime.com/modules/ctcatalog/detail.php?maker=561&year=2010&order=title_d&id_list=27581,27580,27506,27504,27503,27507,27505,27519,27518,27502,27501,27517,27525,27500,27499,27498,27497,27496,27495,27494&page_flag=0,1&id=27506>.

Bilder—Voitl mx III: VOITL Bikes, Jun. 23, 2012 [online] [retrieved Feb. 22, 2017]. Retrieved from the Internet <URL: https://web.archive.org/web/20120623202453/http://www.voitl-bikes.de/bilder_mx3.html>.

Bilder-Voitl mx III: #14 mx Junior, Jun. 1, 2012 [online] [retrieved Feb. 22, 2017]. Retrieved from the Internet <URL: https://web.archive.org/web/20160121103204/http://www.voitl-bikes.de/img/bilder/mx3_014.jpg>.

Anonymous."Short Cranks", ZOXed, Mar. 29, 2013 [online] [retrieved Feb. 22, 2017]. Retrieved from the Internet <URL: https://web.archive.org/web/20131208053919/http://zoxed.eu/short_cranks_html>.

Anonymous. "Check Your Cranks!", Myra's Bike Pages—Myra and Simon's, Feb. 2003 [online] [retrieved Feb. 22, 2017]. Retrieved from the Internet <URL: https://web.archive.org/web/20030201091109/http://www.myra-simon.com/bike/cranks.html>.

* cited by examiner

BICYCLE

FIELD OF THE INVENTION

The present invention relates in general to the field of bicycles. More particularly, the present invention relates to mountain bikes, but the present invention can also be applied in bicycles of different type.

BACKGROUND OF THE INVENTION

Bicycles in general, and mountain bikes in particular, are commonly known, therefore a detailed introductory description thereof is omitted. It suffices to mention that such bicycle comprises a frame with a saddle, a steerable front wheel, and a driven rear wheel that is driven by a chain that in turn is driven by a pedal set mounted for rotation in a bottom bracket of the frame.

Bicycles have been developed in different types, adapted to different types of requirements relating to use. Mountain bikes are typically quite robust and relatively heavy, since they are intended to be used in off-terrain conditions. A good mountain bike will allow its user comfort, for which reason the frame is typically equipped with shock-absorbing suspension. The mountain bike should be stable, and should be agile and be able to be manoeuvred around small and narrow bends. The mountain bike should be capable of relative high speed, and to handle curved paths at relative high speed. On the other hand, the mountain bike should be ergonomically fitted to the user(s).

The above requirements are a challenge to meet in a bicycle design. Some design parameters can be optimized for one characteristic but will then compromise other characteristics.

Generally, the present invention aims to provide an improved design for a mountain bike.

An important characteristic of a mountain bike is its stability, and an important parameter influencing the stability is the centre of gravity. Stability would benefit from a centre of gravity as low as possible.

Another important characteristic of a mountain bike is the ground clearance. The pedal set comprises a pair of pedals mounted on respective cranks attached at opposite ends of the crank shaft or spindle. When the pedal set is rotated by the cyclist, each pedal travels a circle around the rotating spindle, and in this travel path each pedal has a highest position when the corresponding crank is directed vertically upwards from the crank shaft, and a lowest position when the corresponding crank is directed vertically downwards. The ground clearance is the vertical distance between the ground and the pedal in its lowest position.

The "lean angle" is defined as the angle between the frame's midplane of symmetry and a vertical plane. It can be considered a tilting angle with respect to an upright position of the bicycle. When a bicycle is tilted, the ground clearance of one pedal increases while the ground clearance of the opposite pedal decreases.

Safety requires that the bicycle can be tilted up to a certain lean angle while still offering a certain minimum ground clearance (or more).

SUMMARY OF THE INVENTION

An objective of the present invention is to provide a mountain bike with improved stability without jeopardizing the safety requirements relating to lean angle and ground clearance. Particularly, the present invention aims to provide a mountain bike that is more forgiving to the cyclist, that offers better rider experience in climbing and descending, and that gives a better weight load on the front wheel.

Under the condition that the stiffness and robustness of the bike may not be affected, it is very difficult to find ways to lower the centre of gravity of a mountain bike. Mountain bikes for adults have a certain wheel diameter (typically between 26" and 29") and a certain saddle height (although this is adjustable to the size of the cyclist), and this largely defines the frame geometry and hence the centre of gravity.

It would of course be possible to make a smaller frame with reduced saddle height, so that in use the combined centre of gravity of bike and cyclist would be lower, but this would at least reduce the comfort and ergonomic acceptability for the cyclist and the biomechanical efficiency for the cyclist.

It would of course be possible to add weight to a lower area of the frame, but that would increase the overall weight of the bike.

The inventors have surprisingly found a way to lower the centre of gravity without the above disadvantages, by lowering the bottom bracket shell, i.e. the cylindrical frame portion in which the spindle of the crank set rotates. The immediate consequence of this measure is a lowering of the pedal set and hence a reduction of the ground clearance and the maximum allowable lean angle. For this reason, lowering the bottom bracket shell goes against the intuition of any skilled bicycle designer. The inventors however have realized that it is possible to lower the bottom bracket shell and at the same time reduce the length of the cranks. The ground clearance and the maximum allowable lean angle could then be maintained. Reducing the length of the cranks goes against the thinking lines of any skilled bicycle designer, because the crank length is considered to be a standard value which is not varied. It is true that there have been scientific studies to the influence of varying certain design parameters, including crank length, but this has primarily been out of scientific interest.

It is noted that Peter Barzel, Michael Bollschweiler and Christian Smolik, in their 2008 publication "DIE NEUE FAHRRAD TECHNIK" (ISBN 978-3-87073-322-3), disclose several bicycle designs. They discuss many parameters of the bicycle design, but they discuss these parameters individually. In the drawings of FIGS. 27-32, various geometries of the frame are shown, with indicative values for various dimensions of the frame. It is however not mentioned whether the given values are values actually occurring in practice or not. Further, the figures do not relate to mountain bikes with suspension. In the table on page 129, a range of 300-350 mm is mentioned for mountain bikes, but such range indicates that the bottom bracket height will be larger than 300, and not that the lowest bottom bracket height will be equal to 300. In the table on page 115, and in the text above that table, a crank length of 175 mm or longer is mentioned for mountain bikes.

It is further noted that crank sets with reduced crank length are available commercially. There is however no disclosure nor suggestion to combine a crank set with reduced crank length in a mountain bike with suspension and reduced bottom bracket height, as proposed by the present invention.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, in which indications "below/above", "higher/lower", "left/right" etc. only relate to the orientation displayed in the drawings, and in which.

DETAILED DESCRIPTION OF THE INVENTION

Figure 1A:
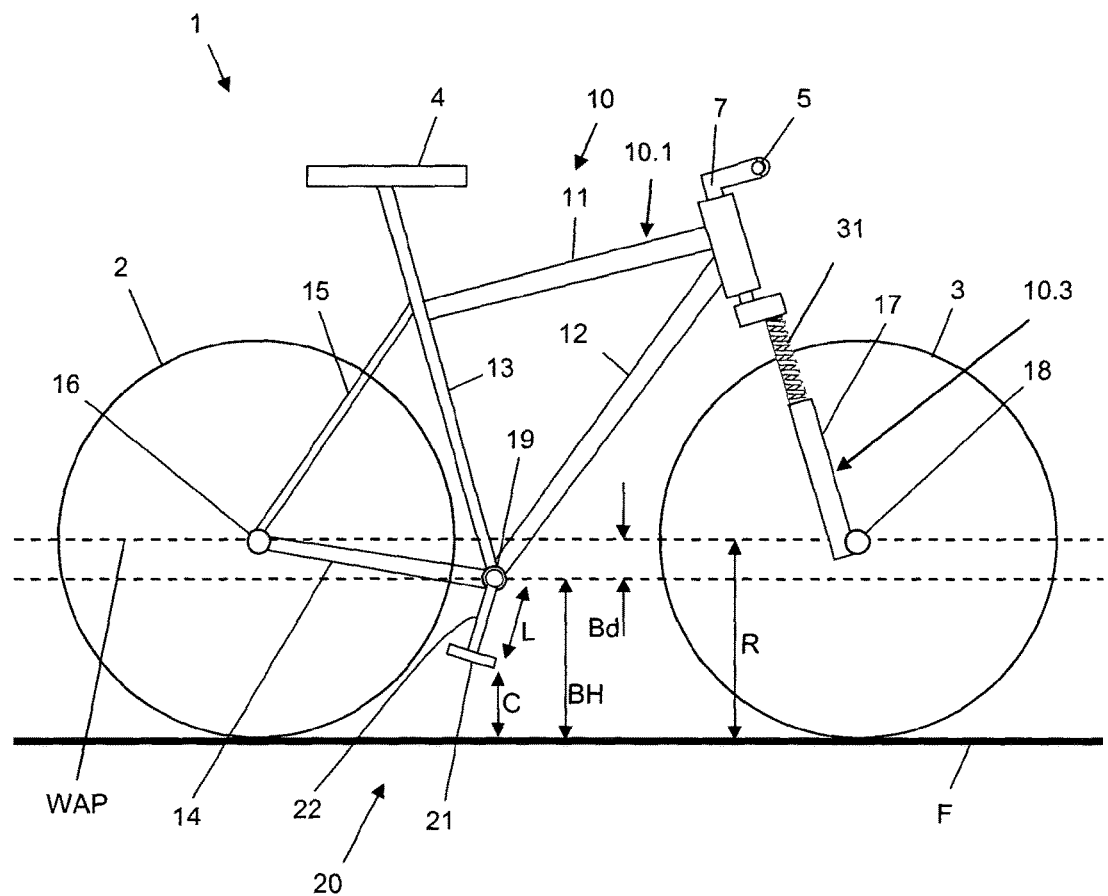
FIG. 1A schematically shows a mountain bike with front suspension.

FIG. 1A schematically shows a mountain bike 1 with front suspension. The bike 1 comprises a rear wheel 2 and a front wheel 3, a saddle 4 and handlebar 5, mounted in a frame 10. The frame 10 in the shown embodiment comprises a top tube 11, a down tube 12, and a seat tube 13, arranged as a triangle; mountain bikes with a different type of frame configuration are also possible. The frame 10 further comprises chain stays 14 and seat stays 15, meeting each other at rear dropouts 16 that receive the rear wheel's axle. The handlebar 5 connects to the front fork 17, which at its lower free ends has front dropouts 18 receiving the front wheel's axle. The down tube 12 and seat tube 13 meet each other at a bottom bracket shell 19. The bike 1 further comprises a pedal set 20, which comprises two pedals 21 mounted at the free ends of respective cranks 22 (only one crank/pedal set being shown for sake of simplicity). The cranks are mounted at respective ends of a spindle (not shown in this figure), that is accommodated for rotation within the bottom bracket shell 19.

Mountain bikes are a type of bicycle that, with a view to robustness and manoeuvrability, have distinguishing design features, as commonly known. For instance, the handlebar 5 typically has a substantially T-shaped design, wherein the bars extend substantially perpendicular to the steering axle 7. The handlebar 5 typically has a length in the range 580-800 mm, typically has a rise in the range 0-35 mm, and typically has a back sweep in the range 0°-20°.

The wheels 2, 3 of a mountain bike are typically provided with relatively wide, robust tyres having a width and height in the range 45-65 mm and having a coarse, knobby profile.

The bike 1 is standing upright on a floor F. An important characteristic is the ground clearance C, which is the vertical distance between the floor F and a pedal 21 in its lowest position. This ground clearance C is correlated to the crank length L and the bracket height BH, which is the vertical distance between the floor F and the centre of the bottom bracket shell 19. The bottom bracket drop Bd is the vertical distance between the centre of the bottom bracket shell 19 and a virtual plane containing the rear wheel's axis and the front wheel's axis. This is a horizontal plane if the wheels are mutually identical. This plane will be indicated as Wheel Axes Plane WAP.

In a typical design of a mountain bike, the wheels have a diameter in the range of 26" to 29". The standard crank length is 175 mm. A standard value for the bottom bracket drop is about 25 mm. For instance, in an example of wheels having a diameter of 26", i.e. a radius R of 330 mm with a 2.0" tire, these values would yield a ground clearance of 130 mm.

The above information applies when the bicycle is not loaded with a cyclist. Mountain bikes, however, typically are provided with front wheel suspension and rear wheel suspension, for generally increasing the comfort and particularly for accommodating the shocks that are experienced when riding in rough terrain at high speed. The mountain bike 1 of FIG. 1A is a mountain bike provided with front wheel suspension only; such bike will also be indicated by the phrase Front Suspension bike or "FS bike". The front fork 17 of the FS bike 1 is provided with at least one suspension element 31. Suspension elements for bikes are commonly known. They may for instance be of hydraulic type or pneumatic type. They may also be of mechanical type, for instance comprising a coil spring. In this application, suspension elements will be depicted as coil spring, but the invention is not limited to this type.

It is noted that the frame 10 comprises components that can move with respect to each other. For instance, the front fork 17 together with the handlebar can rotate with respect to the remainder of the frame, about an approximately vertical axis. In the case of a bike with front suspension, the front fork 17 comprises an upper part and a lower part that can axially move with respect to each other along said approximately vertical axis, this upper and lower part being coupled by the suspension element 31. This lower part of the front fork supports the front wheel 3, and will be indicated as front wheel carrying frame part 10.3. The remainder of the frame 10, which is fixed with respect to the bottom bracket 19, will be indicated as main frame part 10.1.

Figure 1B:
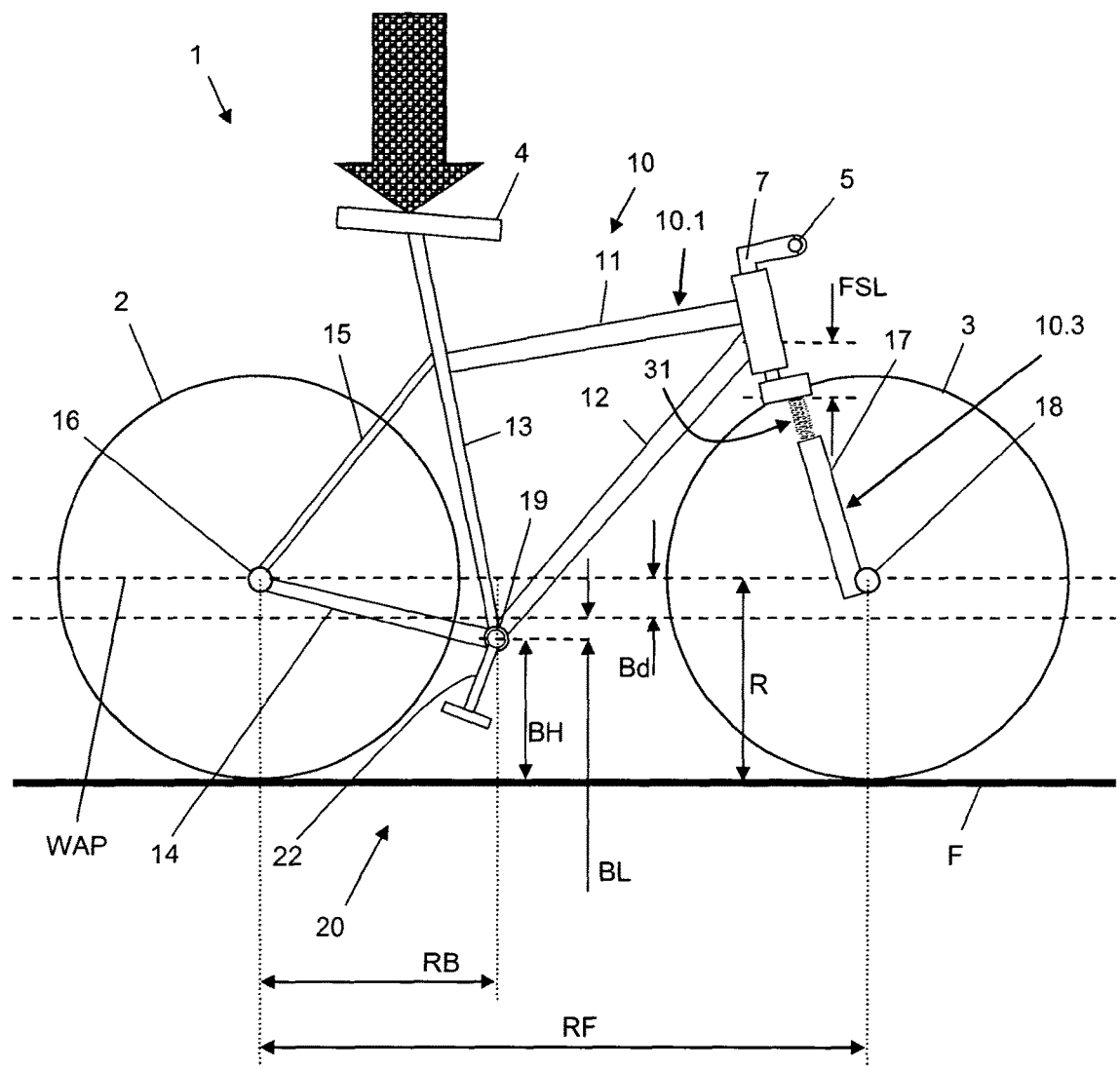
FIG. 1B schematically shows the same bicycle in loaded condition, showing the compression of the front suspension.
Figure 2:
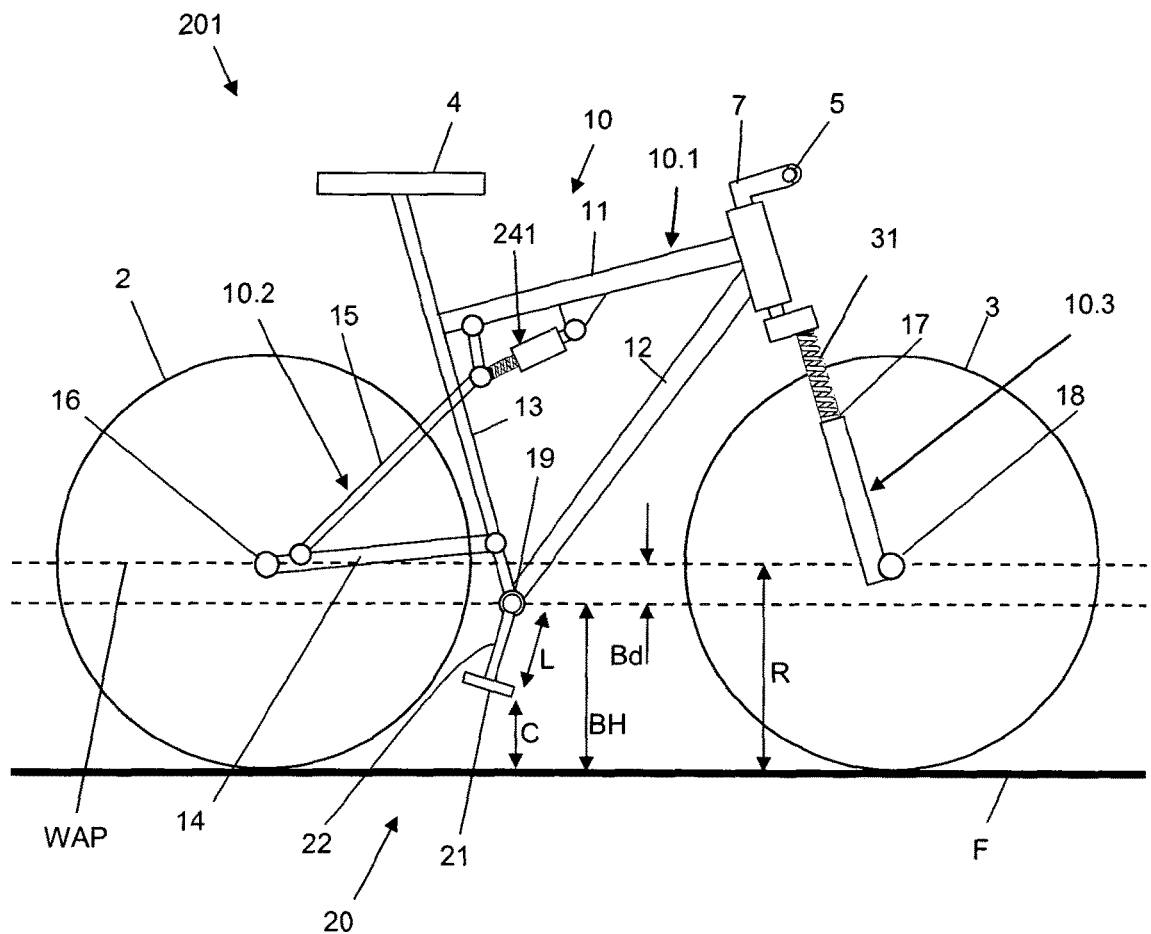
FIGS. 2-5 schematically show various types of mountain bikes with dual suspension.
Figure 3:
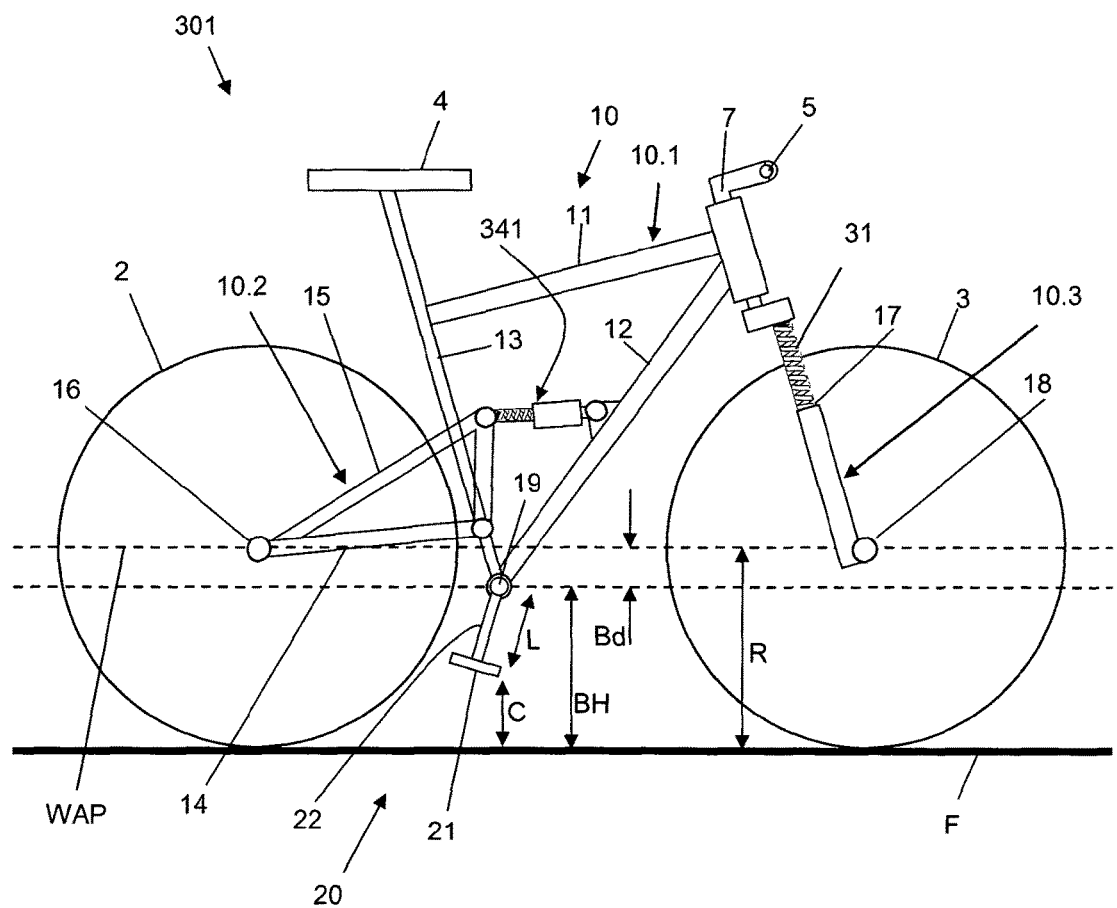
Figure 4:
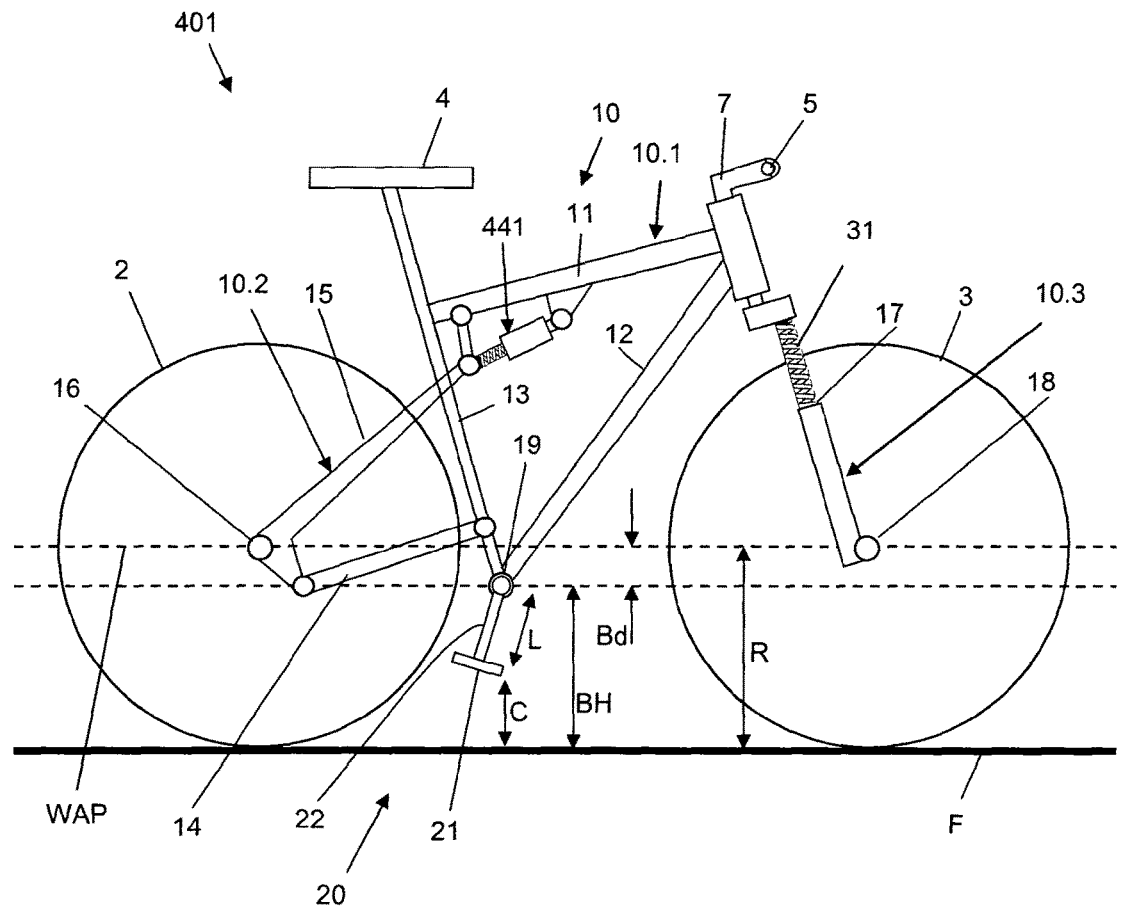

In FIG. 1B, the vertical load caused by the cyclist when he is sitting on the saddle or standing on the pedals is indicated by a vertical arrow. The weight of the cyclist will cause the suspension to give way until a force equilibrium is achieved, i.e. the suspension element 31 will reduce its length. The front wheel 3 will of course remain supported by the floor F. The main frame part 10.1 is slightly rotated about the axis of the rear wheel 2, with the front wheel carrying frame part 10.3 together with the front wheel 3 remaining at the same level. This will have the effect of lowering the position of the bracket shell 19, i.e. reducing the bracket height BH, in practical circumstances. In FIG. 1B, the bracket height BH is, as compared to FIG. 1A, lowered over a vertical distance BL. The compression of the suspension element 31 has caused the front end of the main frame part 10.1 to be lowered by a vertical distance FSL; this is indicated as "sagging".

While the movement of the main frame part 10.1 of an FS bike actually is, as mentioned, a rotation about the axis of the rear wheel 2, the displacement of the bottom bracket 19 may in good approximation be considered to be a vertical displacement. With RB indicating the horizontal distance between rear axis 16 and the centre of the bottom bracket shell 19, and RF indicating the horizontal distance between rear axis 16 and the front axis 18, the formula $$BL/FSL=RB/RF$$

applies in good approximation.

The amount of sagging at the front end of the main frame part 10.1 will in practice depend, inter alia, on the weight of the user, the way he is moving, and the setting of the suspension element 31 (soft suspension or hard suspension, i.e. the spring constant). Further, it is noted that the suspension element 31 is not directed exactly vertical. The situation is even more complex in the case of a mountain bike having dual suspension, i.e. front suspension and rear suspension. Such bicycle will hereinafter also be indicated as Dual Suspension bike or DS bike.

FIGS. 2, 3, 4, 5 schematically illustrate various designs of DS bikes 201, 301, 401, 501, respectively. Each of these bikes is provided with a respective rear suspension element 241, 341, 441, 541. Since the designs shown are known per se, a detailed discussion will be omitted here. It is noted that the frame 10 now comprises a rear wheel carrying frame part 10.2 that, together with the rear wheel 2, can move with respect to the main frame part 10.1, with the precise manner of moving depending on the suspension design. Particularly, the skilled person will recognize that the direction of compression/expansion of the rear suspension element 241, 341, 441, 541 is not necessarily directed vertically.

Figure 5:
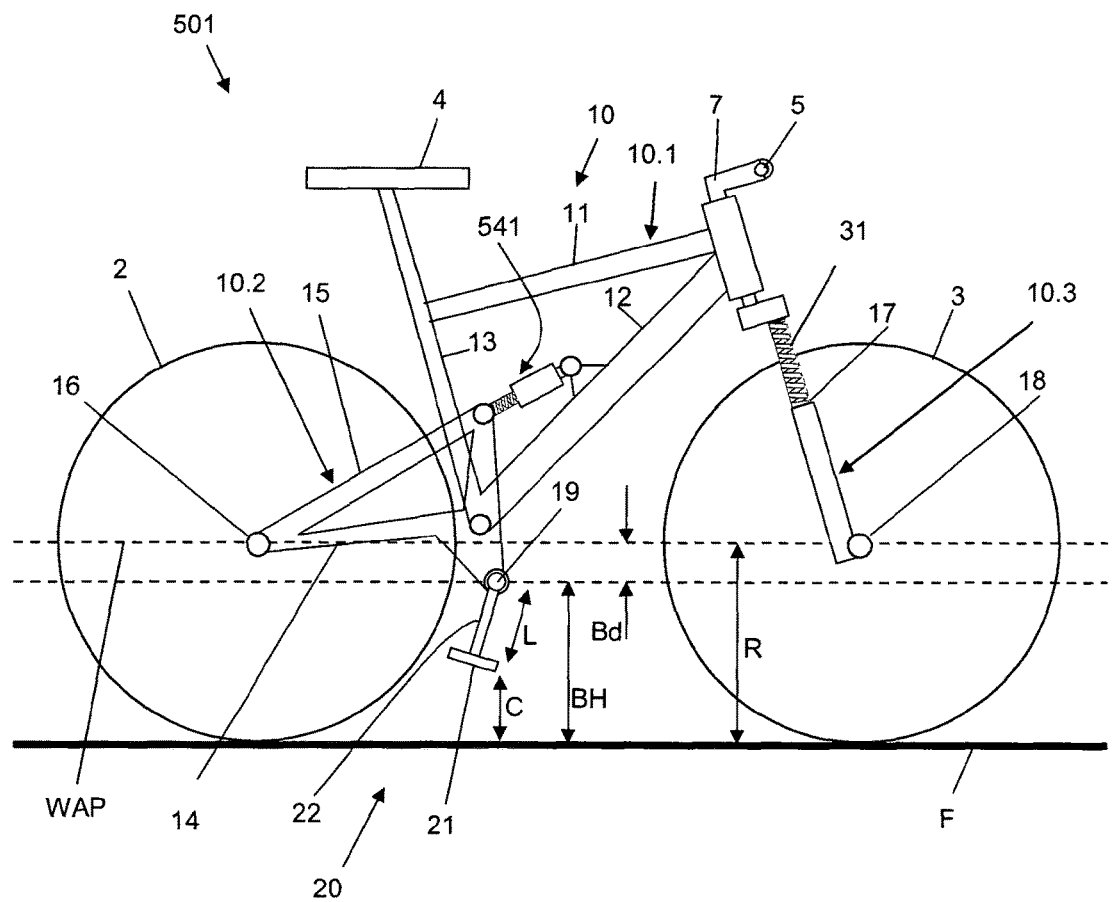

It is further noted that the main frame part 10.1 carries the saddle 4 and the rotation tube for the handlebar, and usually also the bottom bracket 19, but the bottom bracket 19 may also be part of the rear wheel carrying frame part 10.2 (FIG. 5).

While in reality, as illustrated in FIG. 1B, the displacement caused by the user's weight is a displacement of the main frame part 10.1 with respect to the wheels, which remain stationary on the floor F, a simplification is obtained by taking the main frame part 10.1 as stationary reference and describing the displacement of each wheel with respect to this stationary frame part, which displacement is indicated as wheel travel (front wheel travel, rear wheel travel). Further, while the displacement of each wheel may in practice have a horizontal component as well as a vertical component, a further simplification is obtained by only considering the vertical component of this displacement, which is indicated as vertical wheel travel (vertical front wheel travel, vertical rear wheel travel).

While the wheel travel varies during riding (the wheels move up and down during riding), each wheel has two extreme positions which are defined by the extreme positions of the respective suspension element: extremely compressed and extremely expanded. These extreme positions may also be defined by stops. These extreme wheel positions are fixed, i.e. they do not depend on riding conditions nor on the user's weight. In other words, these extreme wheel positions are device constants which can be measured objectively. For each wheel, the vertical distance between said extreme wheel positions will be indicated as the suspension travel: Rear Suspension Travel RST for the rear wheel 2 and Front Suspension Travel FST for the front wheel 3. In the case of an FS bike 1, the Rear Suspension Travel RST is equal to zero.

The inventors have found a parameter that can be calculated from the bicycle in a rest condition without cyclist, and that is a good representation of the condition in practice. This parameter is the Practical Bracket Height PBH, which is defined as:

$$PBH=BH-\beta \cdot (\alpha \cdot FST+(1-\alpha) \cdot RST).$$ In this formula:

RST indicates Rear Suspension Travel, which is defined as the vertical distance between the extreme positions of the rear wheel with respect to the frame as allowed by the rear wheel suspension. In other words, this is the vertical stroke the rear wheel can maximally make. For instance, in the case of a piston-type of suspension, this corresponds to the maximum stroke of the piston, taking into account the angle such piston makes with the vertical. Here, the mutual displacement between frame and wheel is described as a lifting of the wheel with respect to the frame, irrespective of the type of suspension.

FST indicates Front Suspension Travel, which is likewise defined as the vertical distance between the extreme positions of the front wheel with respect to the frame as allowed by the front wheel suspension.

$\alpha$ is a factor between 0 and 1 that expresses the fact that the centre of gravity of the cyclist has a horizontal position that may vary, that this position influences the relative compression of the front and rear suspensions, and that the lowering of the bracket height of the bicycle depends on the bicycle geometry and on the relative compression of the front and rear suspensions. A practical range for $\alpha$ is between 0.3 and 0.45. In one preferred embodiment of the invention, factor $\alpha$ is taken to be equal to 0.35. In another preferred embodiment of the invention, factor $\alpha$ is taken to be equal to the ratio RB/RF, with RF indicating the wheelbase, i.e. the horizontal distance between rear axis and front axis, and RB indicating the rear centre, i.e. the horizontal distance between rear axis and the centre of the bottom bracket shell. This ratio describes the relative influence of sagging of the front wheel suspension and of sagging of the rear wheel suspension: if the bottom bracket shell is closer to the rear axis than to the front axis ($\alpha<0.5$), sagging of the front wheel suspension has less influence than sagging of the rear wheel suspension.

$\beta$ is a factor between 0 and 1 that expresses the average loading of the suspension by a cyclist of average weight while riding on average rough terrain. This average loading is a combination of static loading (static sagging) caused by the cyclist's weight and dynamic loading caused by the shocks of the terrain. Effectively, this factor $\beta$ expresses that, in the case of a bike with suspension, it is not the bracket height of the bicycle in rest that is important, but the expected (average) bracket height of the bicycle in use. In designing a bicycle, the value of factor $\beta$ will in principle depend on the stiffness of the suspension. A practical range for $\beta$ is between 0.15 and 0.25. In one preferred embodiment of the invention, factor $\beta$ is taken to be equal to 0.2.

Some mountain bikes have front wheel suspension only, with FST$\geq$80 mm. Some mountain bikes have front wheel suspension as well as rear wheel suspension, with FST$\geq$100 mm and RST$\geq$100 mm.

In prior art of well-designed mountain bikes, taking $\alpha=0.35$ and $\beta=0.2$, the PBH is always higher than 295 mm.

In the design according to the present invention, taking $\alpha=0.35$ and $\beta=0.2$, the PBH is always lower than 295 mm.

In a preferred design, the crank length L is 164 mm or less, more preferably 160 mm or less, with a most preferred length being 150 mm.

In a particular embodiment, the formula L$\leq$PBH–130 mm applies, with PBH in the range 245-295 mm. In typical embodiments with this formula and within this range, PBH equals 294 mm, or 290 mm, or 275 mm, or 260 mm, or 245 mm.

The pedalling force from the cyclist is transferred to the rear wheel by the chain, which is mounted around a rear chain wheel coupled to the rear wheel and a pedal chain wheel mounted to the right-hand crank. It has already been mentioned in the above that the standard crank length is 175 mm, whereas in accordance with the present invention the crank length is reduced. In the above examples, the crank length is 164 mm or less, 160 mm or less, 145 mm or less, 130 mm or less, 115 mm or less, respectively. It is in principle possible to use the same chain wheels as in standard bikes. However, with the crank length being reduced, it is preferred to use chain wheels with a smaller gear ratio, which in turn leads to a higher pedalling frequency.

It should be clear to a person skilled in the art that the present invention is not limited to the exemplary embodiments discussed above, but that several variations and modifications are possible within the protective scope of the invention as defined in the appending claims. For instance, two or more functions may be performed by one single entity. Even if certain features are recited in different dependent claims, the present invention also relates to an embodiment comprising these features in common. Any reference signs in a claim should not be construed as limiting the scope of that claim.

The invention claimed is:

1. A mountain bike comprising:
a frame with rear dropouts for receiving a rear wheel's axle, a front fork with front dropouts for receiving a front wheel's axle, and a bottom bracket shell for accommodating a spindle of a pedal set;
a rear wheel having its axle mounted in the rear dropouts;
a front wheel having its axle mounted in the front dropouts;
front wheel suspension that allows the front wheel to travel with respect to the frame between two extreme wheel positions having a vertical distance FST with respect to each other;
an optional rear wheel suspension that allows the rear wheel to travel with respect to the frame between two extreme wheel positions having a vertical distance RST with respect to each other;
a pedal set comprising a spindle mounted for rotation in the bottom bracket shell, two cranks mounted at the opposite ends of the spindle, and two pedals mounted for rotation at the free ends of the respective cranks;
wherein each crank has a crank length L, measured between the rotation axis of the spindle and the rotation axis of the corresponding pedal, of 164 mm or less;
wherein the bottom bracket shell has a Practical Bracket Height (PBH) of 294 mm or less, wherein the formula PBH=BH−β·(α·FST+(1−α)·RST) applies;
wherein BH indicates the bracket height, measured as the distance between the rotation axis of the spindle and a line (F) tangent to the rear wheel and to the front wheel;
wherein α is a factor between 0.3 and 0.45;
and wherein β is a factor between 0.15 and 0.25;
wherein RST is equal to zero and FST is equal to 80 mm or more when the mountain bike comprises one suspension, the front wheel suspension; and
wherein RST is equal to 100 mm or more and FST is equal to 100 mm or more when the mountain bike comprises two suspensions, the front wheel suspension and the rear wheel suspension.

2. The mountain bike according to claim 1, wherein β=0.2.

3. The mountain bike according to claim 1, wherein α=0.35.

4. The mountain bike according to claim 1, wherein α indicates the ratio RB/RF, with RF indicating the horizontal distance between the rear axis and front axis, being the wheelbase, and RB indicating the horizontal distance between the rear axis and the center of the bottom bracket shell, being the rear center.

5. The mountain bike according to claim 1, wherein the radius R of each wheel is in the range from 325 mm to 375 mm.

6. The mountain bike according to claim 1 further comprising a handlebar connected to the front fork in a substantially T shaped configuration;
wherein the handlebar extends substantially perpendicular to a rotation axle of the front fork; and
wherein the handlebar has a length in the range 580 mm-800 mm.

7. The mountain bike according to claim 6, wherein the handlebar has a rise in the range 0-35 mm.

8. The mountain bike according to claim 6, wherein the handlebar has a back sweep in the range 0°-20°.

9. The mountain bike according to claim 1, wherein the wheels are provided with tires, each having a width and height in the range 45-65 mm and having a coarse, knobby profile.

10. The mountain bike according to claim 1, wherein the crank length L is 160 mm or less.

11. The mountain bike according to claim 1, wherein the crank length L is 150 mm.

12. The mountain bike according to claim 1, wherein the formula
L=PBH−130 mm applies.

13. The mountain bike according to claim 12, wherein PBH is selected from the group consisting of 294 mm, 290 mm, 275 mm, 260 mm, and 245 mm.

14. The mountain bike according to claim 12, wherein PBH <290 mm.

15. The mountain bike according to claim 12, wherein PBH <245 mm.

16. The mountain bike according to claim 1, wherein the formula
L<PBH−130 mm applies.

17. The mountain bike according to claim 16, wherein PBH is selected from the group consisting of 294 mm, 290 mm, 275 mm, 260 mm, and 245 mm.

18. The mountain bike according to claim 16, wherein PBH <290 mm.

19. The mountain bike according to claim 16, wherein PBH <245 mm.

* * * * *